United States Patent
Garrett

[19]

[11] Patent Number: 5,880,715
[45] Date of Patent: Mar. 9, 1999

[54] PYRAMIDALLY-SHAPED COMPUTER MOUSE

[76] Inventor: Michael David Garrett, 4235 Buck Hill Rd. S., Trumansburg, N.Y. 14886-9642

[21] Appl. No.: 842,762

[22] Filed: Apr. 17, 1997

[51] Int. Cl.[6] .................................................. G09G 5/08
[52] U.S. Cl. ........................ 345/163; 345/156; 345/157; 463/37
[58] Field of Search .................................. 345/156, 163, 345/157, 158; D14/100; 463/36, 37, 38; 273/148 B

[56] References Cited

U.S. PATENT DOCUMENTS

| | | | |
|---|---|---|---|
| 4,862,165 | 8/1989 | Gart | 341/20 |
| 5,280,276 | 1/1994 | Kwok | 345/167 |
| 5,426,449 | 6/1995 | Danzinger | 345/168 |
| 5,473,344 | 12/1995 | Bacon et al. | 345/163 |
| 5,648,798 | 7/1997 | Hamling | 345/163 |
| 5,706,028 | 1/1998 | Murakami et al. | 345/157 |

*Primary Examiner*—Jeffery A. Hofsass
*Assistant Examiner*—Julie Lieu

[57] ABSTRACT

A new Pyramidally-Shaped Computer Mouse for allowing a user to position his or her hand in a physically comfortable and effective position during use. The inventive device includes a pyramidally-shaped housing having four triangular-shaped inclined faces. A first depressible switch and a second depressible switch are disposed on one of the inclined faces and a third depressible switch is disposed on an adjacent inclined face. As such, the first depressible switch and the second depressible switch are operable with the index finger and the middle finger of the user thereof. Accordingly, the third depressible switch is operable with the thumb of the user thereof.

15 Claims, 3 Drawing Sheets

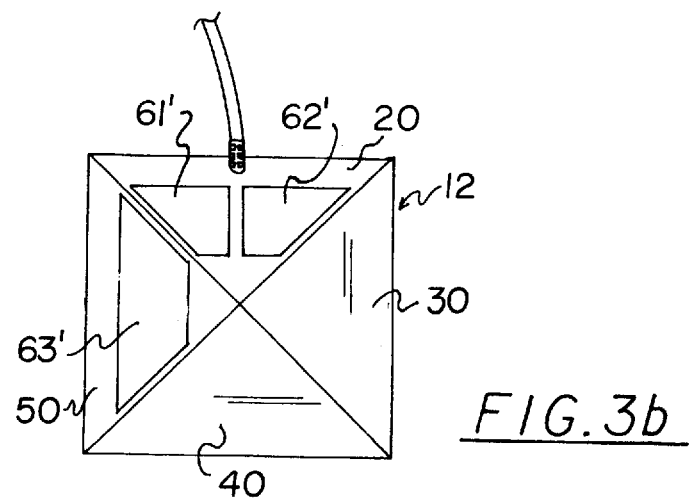
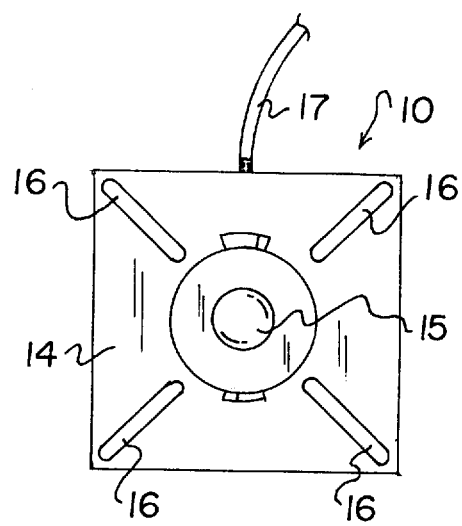

PYRAMIDALLY-SHAPED COMPUTER MOUSE

BACKGROUND OF THE INVENTION

1. Field of the Invention

The present invention relates to hand-held input devices and more particularly pertains to a new Pyramidally-Shaped Computer Mouse for allowing a user to position his or her hand in a physically comfortable and effective position during use.

2. Description of the Prior Art

The use of hand-held input devices is known in the prior art. More specifically, hand-held input devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art hand-held input devices include U.S. Pat. No. 4,862,165; U.S. Pat. No. 5,157,381; U.S. Pat. No. D288,930; U.S. Pat. No. 5,367,631; U.S. Pat. No. D349,493; and U.S. Pat. No. D343,392.

While these devices fulfill their respective, particular objectives and requirements, the aforementioned patents do not disclose a new Pyramidally-Shaped Computer Mouse. The inventive device includes a pyramidally-shaped housing having four triangular-shaped inclined faces. A first depressible switch and a second depressible switch are disposed on one of the inclined faces and a third depressible switch is disposed on an adjacent inclined face. As such, the first depressible switch and the second depressible switch are operable with the index finger and the middle finger of the user thereof. Accordingly, the third depressible switch is operable with the thumb of the user thereof.

In these respects, the Pyramidally-Shaped Computer Mouse according to the present invention substantially departs from the conventional concepts and designs of the prior art, and in so doing provides an apparatus primarily developed for the purpose of allowing a user to position his or her hand in a physically comfortable and effective position during use.

SUMMARY OF THE INVENTION

In view of the foregoing disadvantages inherent in the known types of hand-held input devices now present in the prior art, the present invention provides a new Pyramidally-Shaped Computer Mouse construction wherein the same can be utilized for allowing a user to position his or her hand in a physically comfortable and effective position during use.

The general purpose of the present invention, which will be described subsequently in greater detail, is to provide a new Pyramidally-Shaped Computer Mouse apparatus and method which has many of the advantages of the hand-held input devices mentioned heretofore and many novel features that result in a new Pyramidally-Shaped Computer Mouse which is not anticipated, rendered obvious, suggested, or even implied by any of the prior art hand-held input devices, either alone or in any combination thereof.

To attain this, the present invention generally comprises a pyramidally-shaped housing having four triangular-shaped inclined faces. A first depressible switch and a second depressible switch are disposed on one of the inclined faces and a third depressible switch is disposed on an adjacent inclined face. As such, the first depressible switch and the second depressible switch are operable with the index finger and the middle finger of the user thereof. Accordingly, the third depressible switch is operable with the thumb of the user thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Pyramidally-Shaped Computer Mouse apparatus and method which has many of the advantages of the hand-held input devices mentioned heretofore and many novel features that result in a new Pyramidally-Shaped Computer Mouse which is not anticipated, rendered obvious, suggested, or even implied by any of the prior art hand-held input devices, either alone or in any combination thereof.

It is another object of the present invention to provide a new Pyramidally-Shaped Computer Mouse which may be easily and efficiently manufactured and marketed.

It is a further object of the present invention to provide a new Pyramidally-Shaped Computer Mouse which is of a durable and reliable construction.

An even further object of the present invention is to provide a new Pyramidally-Shaped Computer Mouse which is susceptible of a low cost of manufacture with regard to both materials and labor, and which accordingly is then susceptible of low prices of sale to the consuming public, thereby making such Pyramidally-Shaped Computer Mouse economically available to the buying public.

Still yet another object of the present invention is to provide a new Pyramidally-Shaped Computer Mouse which provides in the apparatuses and methods of the prior art some of the advantages thereof, while simultaneously overcoming some of the disadvantages normally associated therewith.

Still another object of the present invention is to provide a new Pyramidally-Shaped Computer Mouse for allowing a user to position his or her hand in a physically comfortable and effective position during use.

Yet another object of the present invention is to provide a new Pyramidally-Shaped Computer Mouse which includes a pyramidally-shaped housing having four triangular-shaped inclined faces. A first depressible switch and a second depressible switch are disposed on one of the inclined faces and a third depressible switch is disposed on an adjacent inclined face. As such, the first depressible switch and the second depressible switch are operable with the index finger and the middle finger of the user thereof. Accordingly, the third depressible switch is operable with the thumb of the user thereof.

Still yet another object of the present invention is to provide a new Pyramidally-Shaped Computer Mouse that would fit easily and comfortably into the palm of the user's hand.

Even still another object of the present invention is to provide a new Pyramidally-Shaped Computer Mouse that would reduce hand, wrist, arm, shoulder, and neck fatigue.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 3a, 3b, and 3c are top views of three embodiments of the present invention.

FIG. 4 is a bottom view of the present invention.

DESCRIPTION OF THE PREFERRED EMBODIMENT

Figure 1:
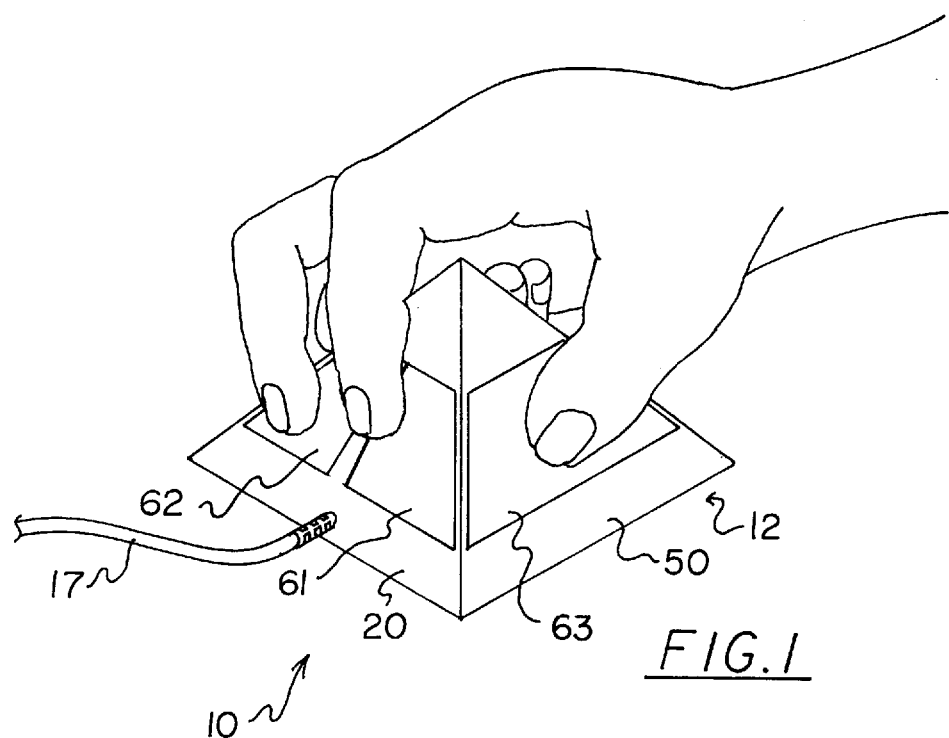
FIG. 1 is an illustration of a new Pyramidally-Shaped Computer Mouse according to the present invention.

With reference now to the drawings, and in particular to FIGS. 1 through 4 thereof, a new Pyramidally-Shaped Computer Mouse embodying the principles and concepts of the present invention and generally designated by the reference numeral 10 will be described.

More specifically, it will be noted that the Pyramidally-Shaped Computer Mouse 10 comprises a pyramidally-shaped housing 12 having four triangular-shaped inclined faces 20, 30, 40, and 50. A first depressible switch 61 and a second depressible switch 62 are disposed on one of the inclined faces and a third depressible switch 63 is disposed on an adjacent inclined face. As such, the first depressible switch 61 and the second depressible switch 62 are operable with the index finger and the middle finger of the user thereof. Accordingly, the third depressible switch 63 is operable with the thumb of the user thereof.

As best illustrated in FIGS. 1 through 3, it can be shown that the pyramidally-shaped housing 12 includes a first triangular-shaped inclined face 20, a second triangular-shaped inclined face 30, a third triangular-shaped inclined face 40, and a fourth triangular-shaped inclined face 50. Each inclined face has a bottom edge 21, 31, 41, and 51, respectively, and two side edges 22 and 23, 32 and 33, 42 and 43, 52 and 53, respectively, each extending from opposite ends of the bottom edge in converging relation to a vertex. The first triangular-shaped inclined face 20 and the second triangular-shaped inclined face 30 are joined along abutting side edges 23 and 32 thereof, the second triangular-shaped inclined face 30 and the third triangular-shaped inclined face 40 are joined along abutting side edges 33 and 42 thereof, the third triangular-shaped inclined face 40 and the fourth triangular-shaped inclined face 50 are joined along abutting side edges 43 and 52 thereof, and the fourth triangular-shaped inclined face 50 and the first triangular-shaped inclined face 20 are joined along abutting side edges 53 and 22 thereof.

Accordingly, the first triangular-shaped inclined face 20 is adjacent the fourth triangular-shaped inclined face 50 and the second triangular-shaped inclined face 30, the second triangular-shaped inclined face 30 is adjacent the first triangular-shaped inclined face 20 and the third triangular-shaped inclined face 40, the third triangular-shaped inclined face 40 is adjacent the second triangular-shaped inclined face 30 and the fourth triangular-shaped inclined face 50, and the fourth triangular-shaped inclined face 50 is adjacent the third triangular-shaped inclined face 40 and the first triangular-shaped inclined face 20.

The vertexes of the inclined faces form an apex 13 of the pyramidally-shaped housing 12. Furthermore, the inclined faces form a hollow interior (not shown) of the pyramidally-shaped housing 12. While each inclined face is substantially planar, the abutting side edges of the inclined faces may be slightly chamfered for comfortability. Furthermore, the apex 13 of the pyramidally-shaped housing may also be slightly chamfered. In an illustrative embodiment, the bottom edge of each inclined face has a length of 100 mm and the apothem of each inclined face has a length of 82.36391037 mm.

Figure 3A:
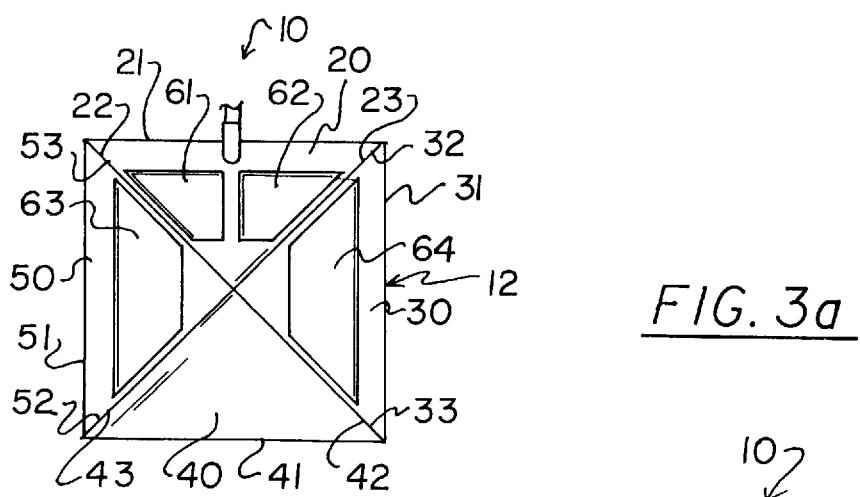

In a first embodiment, illustrated in FIG. 3a, a first depressible switch 61 and a second depressible switch 62 are disposed on the first triangular-shaped inclined face 20. Furthermore, a third depressible switch 63 and a fourth depressible switch 64 are disposed on the fourth triangular-shaped inclined face 50 and the second triangular-shaped inclined face 30, respectively. As such, the first depressible switch 61 and the second depressible switch 62 are independently operable with the index finger and the middle finger of the user thereof. Accordingly, the third depressible switch 63 is operable with the thumb of the right hand of the user thereof and the fourth depressible switch 64 is operable with the thumb of the left hand of the user thereof.

In a second embodiment, illustrated in FIG. 3b, a first depressible switch 61' and a second depressible switch 62' are disposed on the first triangular-shaped inclined face 20 and a third depressible switch 63' is disposed on the fourth triangular-shaped inclined face 50. As such, the first depressible switch 61' and the second depressible switch 62' are operable with the index finger and the middle finger of the user thereof. Accordingly, the third depressible switch 63' is operable with the thumb of the right hand of the user thereof.

Figure 3C:
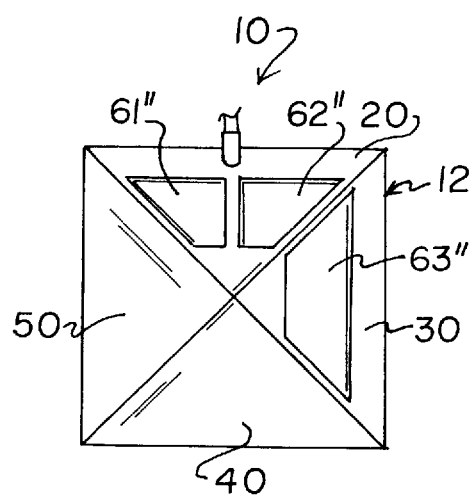

In a third embodiment, illustrated in FIG. 3c, a first depressible switch 61" and a second depressible switch 62" are disposed on the first triangular-shaped inclined face 20 and a third depressible switch 63" is disposed on the second triangular-shaped inclined face 30. As such, the first depressible switch 61" and the second depressible switch 62" are operable with the index finger and the middle finger of the user thereof. Accordingly, the third depressible switch 63" is operable with the thumb of the left hand of the user thereof.

Figure 2A:
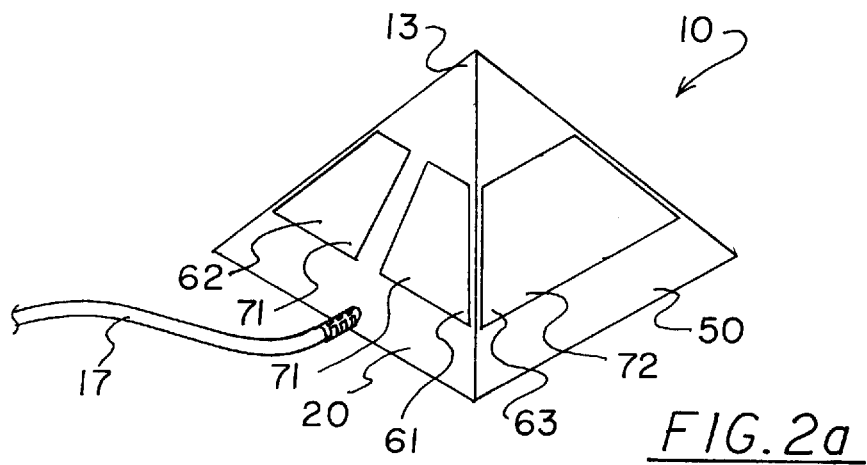
FIGS. 2a and 2b are illustrations of the switches of the present invention.

In a first embodiment, illustrated in FIG. 2a, the first depressible switch 61 and the second depressible switch 62 have a first trapezoidal shape 71 wherein the second depressible switch 62 mirrors the first depressible switch 61. The first trapezoidal shape 71 has a bottom parallel to the bottom edge 21 of the first triangular-shaped inclined face 20, a top parallel to the bottom thereof, a first side perpendicular to the bottom and the top thereof, and a second side parallel to an adjacent side edge 22 of the first triangular-shaped inclined face 20.

In the first embodiment, the third depressible switch 63 and the fourth depressible switch 64 have a second trapezoidal shape 72 wherein the fourth depressible switch 64 mirrors the third depressible switch 63. The second trapezoidal shape 72 has a bottom parallel to the bottom edge 51 of the fourth triangular-shaped inclined face 50, a top parallel to the bottom thereof, a first side parallel to a first side edge 52 of the fourth triangular-shaped inclined face 50, and a second side parallel to a second side edge 53 of the fourth triangular-shaped inclined face 50.

Figure 2B:
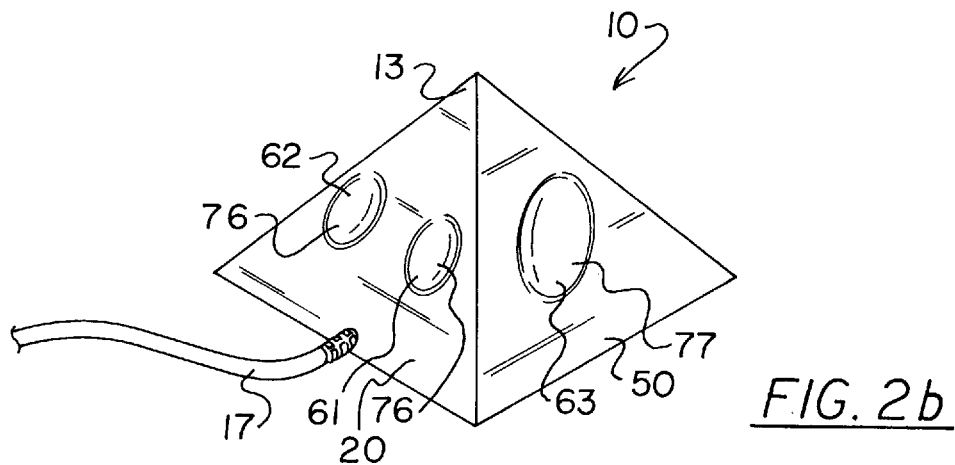

In a second embodiment, illustrated in FIG. 2b, the first depressible switch 61 and the second depressible switch 62 have a first elliptical shape 76 wherein the second depressible switch 62 mirrors the first depressible switch 61. In the second embodiment, the third depressible switch 63 and the fourth depressible switch 64 have a second elliptical shape 77 wherein the fourth depressible switch 64 mirrors the third depressible switch 63. In an illustrative embodiment, the second elliptical shape 77 is larger than the first elliptical shape 76.

As best illustrated in FIG. 4, it can be shown that a substantially planar base member 14 encloses the hollow interior of the pyramidally-shaped housing 12 and provides stable engagement with an underlying surface. A relative position sensor 15 is mounted within the base member 14 for sensing the relative position of the Pyramidally-Shaped Computer Mouse 10 with respect to the underlying surface. As such, the user may manipulate the position of a cursor displayed on a display device of an associated computer.

The base member 14 abuts the bottom edges 21, 31, 41, and 51 of the inclined faces 20, 30, 40, and 50, respectively, and, therefore, is substantially square in shape. The base member 14 includes a plurality of ridges 16 extending from the corners thereof towards the center thereof. The ridges 16 minimize friction between the base member 14 and the underlying surface.

A cable 17 extends from the Pyramidally-Shaped Computer Mouse 10 for operable connection thereof with a computer or other device being controlled thereby. Alternatively, the present invention may be operably connected with the computer or other device with the use of wireless technology.

A selective disabling and enabling means is provided for selectively disabling and enabling operation of the relative position sensor 15. The disabling and enabling means allows for relocation of the Pyramidally-Shaped Computer Mouse 10 on the underlying surface without correspondingly relocating the cursor of the display device while the base member 14 remains in contact with the underlying surface. As such, the Pyramidally-Shaped Computer Mouse 10 may be relocated independent of the relative position sensor 15 without having to lift the Pyramidally-Shaped Computer Mouse 10 above the underlying surface. In use, the user disables the relative position sensor 15 with the disabling and enabling means, repositions the Pyramidally-Shaped Computer Mouse 10 on the underlying surface, and enables the relative position sensor with the disabling and enabling means. In an illustrative embodiment, the disabling and enabling means is actuatable by one or both of the third depressible switch 63 and the fourth depressible switch 64.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hand-held input device for use with a computer enabling a user thereof to interact with a display device associated with said computer, said input device comprising:

a pyramidally-shaped housing having four triangular-shaped inclined planar faces and an interior, said inclined planar faces being separated from each other by straight edges, said straight edges converging together at a top of said housing;

a first depressible switch and a second depressible switch each disposed on a first of said inclined planar faces, said first depressible switch and said second depressible switch independently operable with at least one of an index finger and a middle finger of said user thereof;

a third depressible switch disposed on a second of said inclined planar faces, said second of said inclined planar faces adjacent said first of said inclined planar faces, wherein said first and second depressible switches are separated from said third depressible switch by one of said straight edges for facilitating a tactile distinction of said first and second switches from said third switch, said third depressible switch operable with a thumb of a first hand of said user thereof; and a substantially planar base member enclosing said hollow interior of said pyramidally-shaped housing, said base member providing stable engagement with an underlying surface.

2. The input device of claim 1, further comprising:

a relative positioning means provided on said base member for sensing the relative position of said input device with respect to said underlying surface.

3. The input device of claim 2, further comprising:

a selective disabling and enabling means for selectively disabling and enabling operation of said relative positioning means, said disabling and enabling means allowing for relocation of said input device on said underlying surface without said relative positioning means sensing the relative position of said input device with respect to said underlying surface.

4. A hand-held input device for use with a computer enabling a user thereof to interact with a display device associated with said computer, said input device comprising:

a pyramidally-shaped housing having four triangular-shaped inclined faces and a hollow interior;

a first depressible switch and a second depressible switch each disposed on a first of said inclined faces;

said first depressible switch and said second depressible switch independently operable with at least one of an index finger and a middle finger of said user thereof;

a third depressible switch disposed on a second of said inclined faces, said second of said inclined faces adjacent said first of said inclined faces;

said third depressible switch operable with a thumb of a first hand of said user thereof;

a substantially planar base member enclosing said hollow interior of said pyramidally-shaped housing, said base member providing stable engagement with an underlying surface;

a relative positioning means provided on said base member for sensing the relative position of said input device with respect to said underlying surface;

a selective disabling and enabling means for selectively disabling and enabling operation of said relative positioning means;

said disabling and enabling means allowing for relocation of said input device on said underlying surface without said relative positioning means sensing the relative position of said input device with respect to said underlying surface; and wherein said disabling and enabling means is actuatable by said third depressible switch.

5. The input device of claim 4, wherein said first depressible switch and said third depressible switch each have a trapezoidal shape, said second depressible switch being a mirror image of said first depressible switch.

6. The input device of claim 4, wherein said first depressible switch and third depressible switch each have an elliptical shape, said second depressible switch being a mirror image of said first depressible switch.

7. The input device of claim 4, further comprising:

a fourth depressible switch disposed on a third of said inclined planar faces, said third of said inclined planar faces adjacent said first of said inclined planar faces and opposite said second of said inclined planar faces, said fourth depressible switch operable with a thumb of a second hand of said user thereof, said fourth depressible switch being a mirror image of said third depressible switch.

8. The input device of claim 4, further comprising:

a friction minimizing means provided on said base member for minimizing friction between said base member and said underlying surface.

9. The input device of claim 8, wherein said friction minimizing means comprises:

a plurality of ridges extending from the perimeter of said base member towards the center thereof.

10. A hand-held input device for use with a computer enabling a user thereof to interact with a display device associated with said computer, said input device comprising:

a pyramidally-shaped housing said pyramidally-shaped housing including
a first triangular-shaped inclined face,
a second triangular-shaped inclined face,
a third triangular-shaped inclined face, and
a fourth triangular-shaped inclined face
said first, second, third, and fourth triangular-shaped inclined faces integrally joined along abutting side edges thereof and defining a hollow interior,
said first triangular-shaped inclined face adjacent said fourth triangular-shaped inclined face and said second triangular-shaped inclined face,
said second triangular-shaped inclined face adjacent said first triangular-shaped inclined face and said third triangular-shaped inclined face
said third triangular-shaped inclined face adjacent said second triangular-shaped inclined face and said fourth triangular-shaped inclined face, and
said fourth triangular-shaped inclined face adjacent said third triangular-shaped inclined face and said first triangular-shaped inclined face;

a first depressible switch and a second depressible switch each disposed on said first triangular-shaped inclined face, said first depressible switch and said second depressible switch independently operable with at least one of an index finger and a middle finger of said user thereof;

a third depressible switch disposed on one of said fourth triangular-shaped inclined face and said second triangular-shaped inclined face, said third depressible switch operable with a thumb of a first hand of said user thereof;

a substantially planar base member enclosing said hollow interior of said pyramidally-shaped housing, said base member providing stable engagement with an underlying surface;

a fourth depressible switch disposed on an other of said said fourth triangular-shaped inclined face and said second triangular-shaped inclined face;

said fourth depressible switch operable with a thumb of a second hand of said user thereof;

a relative positioning means provided on said base member for sensing the relative position of said input device with respect to said underlying surface;

a selective disabling and enabling means for selectively disabling and enabling operation of said relative positioning means;

said disabling and enabling means allowing for relocation of said input device on said underlying surface without said relative positioning means sensing the relative position of said input device with respect to said underlying surface; and wherein said disabling and enabling means is actuatable by at least one of said third depressible switch and said fourth depressible switch.

11. The input device of claim 10, wherein said first depressible switch has a first trapezoidal shape, and wherein said third depressible switch has a second trapezoidal shape, said second depressible switch being a mirror image of said first depressible switch.

12. The input device of claim 10, wherein said first depressible switch has a first elliptical shape, and wherein said third depressible switch has a second elliptical shape, said second depressible switch being a mirror image of said first depressible switch.

13. The input device of claim 10, wherein said fourth depressible switch is a mirror image of said third depressible switch.

14. The input device of claim 10, further comprising:
 a friction minimizing means provided on said base member for minimizing friction between said base member and said underlying surface.

15. The input device of claim 14, wherein said friction minimizing means comprises:
 a plurality of ridges extending from the perimeter of said base member towards the center thereof.

* * * * *